(12) United States Patent
Slama et al.

(10) Patent No.: US 9,488,498 B2
(45) Date of Patent: Nov. 8, 2016

(54) CAM SHAFT ROTATION SENSOR

(71) Applicant: Infineon Technologies AG, Neubiberg (DE)

(72) Inventors: Peter Slama, Klagenfurt (AT); Dirk Hammerschmidt, Villach (AT); Tobias Werth, Villach (AT)

(73) Assignee: Infineon Technologies AG, Neubiberg (DE)

( * ) Notice: Subject to any disclaimer, the term of this patent is extended or adjusted under 35 U.S.C. 154(b) by 172 days.

(21) Appl. No.: 14/221,570

(22) Filed: Mar. 21, 2014

(65) Prior Publication Data

US 2015/0268065 A1 Sep. 24, 2015

(51) Int. Cl.
*G01M 15/06* (2006.01)
*G01D 5/244* (2006.01)
*G01D 5/14* (2006.01)
*G01D 5/246* (2006.01)
*G01D 5/249* (2006.01)

(52) U.S. Cl.
CPC ............. *G01D 5/244* (2013.01); *G01D 5/145* (2013.01); *G01D 5/246* (2013.01); *G01D 5/249* (2013.01); *G01D 5/24452* (2013.01)

(58) Field of Classification Search
USPC ............... 73/114.02, 114.03, 114.04, 114.26, 73/114.27, 114.28
See application file for complete search history.

(56) References Cited

U.S. PATENT DOCUMENTS

| | | | |
|---|---|---|---|
| 5,361,630 A * | 11/1994 | Kowalski | 73/114.27 |
| 6,212,783 B1 | 4/2001 | Ott et al. | |
| 7,814,874 B2 * | 10/2010 | Kubani et al. | 123/90.17 |
| 8,109,136 B2 | 2/2012 | Moessner | |
| 2005/0217355 A1 * | 10/2005 | Wildman | 73/116 |
| 2007/0245989 A1 * | 10/2007 | Nguyen et al. | 123/90.17 |
| 2007/0261670 A1 * | 11/2007 | Nguyen et al. | 123/406.59 |
| 2009/0139478 A1 * | 6/2009 | Dell et al. | 123/90.31 |
| 2009/0183701 A1 * | 7/2009 | Nguyen et al. | 123/90.15 |

(Continued)

FOREIGN PATENT DOCUMENTS

DE 19722016 A1 12/1998
DE 19900641 A1 1/2000

(Continued)

OTHER PUBLICATIONS

Witschnig, et al. "A Fully Monolithic Integrated Anisotropic Magnetoresistance Based Angle Sensor for Automotive." Transducers 2013, Barcelona, Spain, Jun. 16-20, 2013.

(Continued)

*Primary Examiner* — Eric S McCall
(74) *Attorney, Agent, or Firm* — Eschweiler & Associates, LLC

(57) ABSTRACT

A sensor device is provided with a magnetic field sensitive element to be positioned in a magnetic field of a magnet. The magnet is positioned on an end face of a cam shaft of an engine. The magnetic field sensitive element is configured to sense an orientation angle of the magnetic field in the range between 0° and 360°. Further, the sensor device is provided with a memory. The memory stores a mapping of pulse edges to orientation angles. Further, the sensor device is provided with electronic circuitry. The electronic circuitry is configured to generate, depending on the sensed orientation angle and the stored mapping of pulse edges to orientation angles, a signal comprising a pattern of pulses with rising and falling pulse edges which are mapped to predefined orientation angles as sensed by the magnetic field sensitive element.

23 Claims, 4 Drawing Sheets

(56) References Cited

U.S. PATENT DOCUMENTS

| | | |
|---|---|---|
| 2009/0190283 A1* | 7/2009 | Hammerschmidt et al. . 361/240 |
| 2011/0073054 A1* | 3/2011 | Metcalf et al. ............ 123/90.17 |
| 2013/0238278 A1 | 9/2013 | Shoemaker et al. |
| 2014/0288883 A1* | 9/2014 | Hammerschmidt et al. . 702/187 |

FOREIGN PATENT DOCUMENTS

| | | |
|---|---|---|
| DE | 10034927 A1 | 2/2002 |
| EP | 2161547 A1 | 3/2010 |
| JP | 2000351336 A | 12/2000 |
| JP | 2006226816 A | 8/2006 |
| JP | 2008026081 A | 2/2008 |
| JP | 2008533497 A | 8/2008 |
| JP | 2008233090 A | 10/2008 |
| JP | 2011257166 A | 12/2011 |
| JP | 2013257231 A | 12/2013 |

OTHER PUBLICATIONS

U.S. Appl. No. 14/306,442, filed Jun. 17, 2014.

* cited by examiner

CAM SHAFT ROTATION SENSOR

TECHNICAL FIELD

The present application relates to a sensor device and to a method of sensing rotation of a cam shaft in an engine.

BACKGROUND

In the field of engines, e.g., combustion engines as used in the automotive field, rotation of a cam shaft may be sensed and be used for controlling injection of fuel into combustion chambers of the engine. For example, the current rotational angle of the cam shaft may be used for setting a timing of injection of air-fuel mixture, duration of the injection, or opening and dwell angles of valves used for the injection of fuel.

A known way of sensing rotation of the cam shaft is to place a ferromagnetic toothed wheel on the cam shaft and use a Hall sensor to detect passing of teeth of the toothed wheel. The output of such Hall sensor corresponds to a pattern of pulses in which the frequency of pulses varies according to the speed of rotation. By giving the different teeth of the toothed wheel a size which is distinctive with respect to other teeth of the toothed wheel, it becomes also possible to distinguish between different angular positions in the course of a single rotation of the cam shaft.

However, evaluation of the current rotation angle using such toothed wheel requires that the cam shaft is actually rotating. Further, complex algorithms may be needed for accurately estimating the current rotation angle from the sensed pattern of pulses. Also, the achievable accuracy may significantly depend on manufacturing accuracy of the toothed wheel.

Accordingly there is a need for techniques which allow for sensing rotation of a cam shaft of an engine in an efficient and accurate manner.

SUMMARY

According to an embodiment, a sensor device is provided with a magnetic field sensitive element which is to be positioned in a magnetic field of a magnet. The magnet is positioned on an end face of a cam shaft of an engine. The magnetic field sensitive element is configured to sense an orientation angle of the magnetic field in the range between 0° and 360°. Further, the sensor device is provided with a memory. The memory stores a mapping of pulse edges to orientation angles. Further, the sensor device is provided with electronic circuitry. The electronic circuitry is configured to generate, depending on the sensed orientation angle and the stored mapping of pulse edges to orientation angles, a signal comprising a pattern of pulses with rising and falling pulse edges which are mapped to predefined orientation angles as sensed by the magnetic field sensitive element.

According to further embodiments of the invention, other devices, systems, or methods may be provided. Such embodiments will be apparent from the following detailed description in connection with the accompanying drawings.

DETAILED DESCRIPTION

Figure 1:
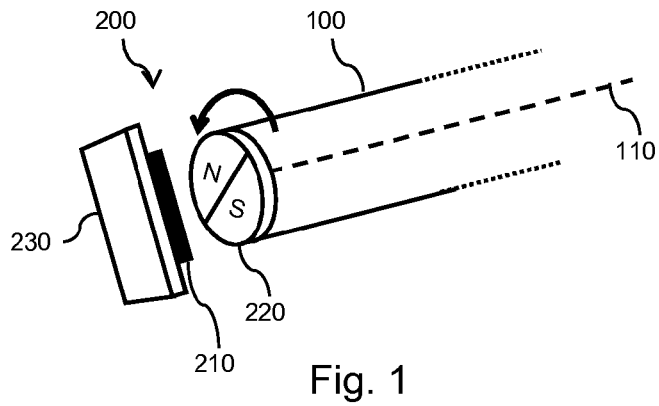
FIG. 1 schematically illustrates a sensor device according to an embodiment of the invention.

In the following, various embodiments will be described in detail with reference to the accompanying drawings. It should be noted that these embodiments serve only as examples and are not to be construed as limiting. For example, while embodiments with a plurality of features, other embodiments may comprise less features and/or alternative features. Furthermore, features from different embodiments may be combined with each other unless specifically noted otherwise.

Embodiments as illustrated in the following relate to sensing of rotation of a shaft, in particular a cam shaft of an engine. The illustrated embodiments cover corresponding sensor devices, systems, and methods.

In the illustrated embodiments, a magnetic field sensitive element is utilized, which is positioned in a magnetic field of a magnet. The magnet is positioned on an end face of the cam shaft of the engine. The magnetic field sensitive element is configured to sense an orientation angle of the magnetic field in the range between 0° and 360°. For example, the magnetic field sensitive element may be based on a magnetoresistive effect, such as the Giant Magnetoresistance (GMR) effect, Anisotropic Magnetoresistance (AMR) effect or Hall effect. An exemplary implementation of the magnetic field sensitive element could be based on two GMR devices with two different maximum sensitivity directions in a plane which is parallel to the end face of the cam shaft and perpendicular to a longitudinal direction and rotation axis of the cam shaft. Such magnetic field sensitive element may allow for accurate detection of the orientation angle of the magnetic field of a dipole magnet having a magnetization which is oriented perpendicular to the rotation axis of the cam shaft. In particular, such magnetic field sensitive element may be used in a compass like manner to sense the orientation of the magnetic field of the magnet which rotates together with the cam shaft.

Further, the illustrated embodiments utilize a stored mapping of pulse edges to orientation angles. In some implementations, the mapping can be configurable, e.g., by programming the memory. Depending on this mapping and the orientation angle of the magnetic field as sensed by the magnetic field sensitive element, a first signal is generated which includes a pattern of pulses with rising and falling pulse edges which are mapped to predefined orientation angles as sensed by the magnetic field sensitive element. The first signal may be used to emulate a pulse pattern as generated by a sensor assembly which is based on an asymmetric toothed wheel, thereby achieving compatibility to existing engine controller interfaces. In addition, the sensed angular orientation may be used to generate a second signal which represents a current rotation angle of the cam shaft in the range between 0° and 360°. In the latter case, the current rotation angle may be represented by a digital value, an analog value, or a pulse width modulated value. Different modes of operation may be provided for outputting either the first signal or the second signal. For example, a sensor device may be provided with a first mode of operation in which the sensor device outputs the first signal and a second mode of operation in which the sensor device outputs the second signal instead of the first signal.

Switching between the first mode of operation and the second mode of operation may be accomplished according to an operational status of the engine. For example, the second mode of operation may be used at startup of the engine, e.g., when the cam shaft is still substantially static, which means that the first signal is not yet fully useable. After a given number of rotations of the cam shaft or if a given rotation speed is reached, the sensor device may switch to the first mode of operation.

In some implementations, the orientation of the magnetic field as sensed by the magnetic field sensitive element may also be used as a basis for generating further signals. For example, depending on the sensed orientation angle, a further signal may be generated which represents an angular speed of the cam shaft. The angular speed may then be represented by a digital value, an analog value, or a pulse width modulated value.

The above embodiments will now be further explained with reference to the drawings.

FIG. 1 schematically illustrates a sensor device 200 according to an embodiment. The sensor device 200 is configured to sense rotation of a cam shaft 100 of an engine. Accordingly, the sensor device 200 will in the following also be referred to as rotation sensor.

In the illustrated implementation, the sensor device 200 includes a magnetic field sensitive element 210, in the following also referred to as sensor element, and a magnet 220. As illustrated, the magnet 220 may be a disc-shaped dipole magnet which is mounted on the end face of the cam shaft 100. The magnetization of the magnet 220 (from south pole "S" to north pole "N") is oriented perpendicularly to the longitudinal rotation axis 110 of the cam shaft 100. Accordingly, when the cam shaft rotates, the orientation of the magnetic field of the magnet 220 changes in a clock hand manner around the longitudinal rotation axis 110 of the cam shaft 100. As mentioned above, the sensor element 210 may for example be based on two GMR devices each having a different maximum sensitivity direction in a plane which is perpendicular to the longitudinal rotation axis 110 of the cam shaft 100, thereby allowing for sensing the absolute angle of the orientation of the magnetic field in a range from 0° to 360°. Further, the sensor device 200 includes electronic output circuitry 230 which is configured to generate various kinds of output signals from the orientation angle of the magnetic field as sensed by the sensor element 210. The sensor element 210 and the output circuitry 230 may be arranged on the same semiconductor chip or in the same chip package. Functionalities of the output circuitry 230 are further illustrated by the block diagram of FIG. 2.

Figure 2:
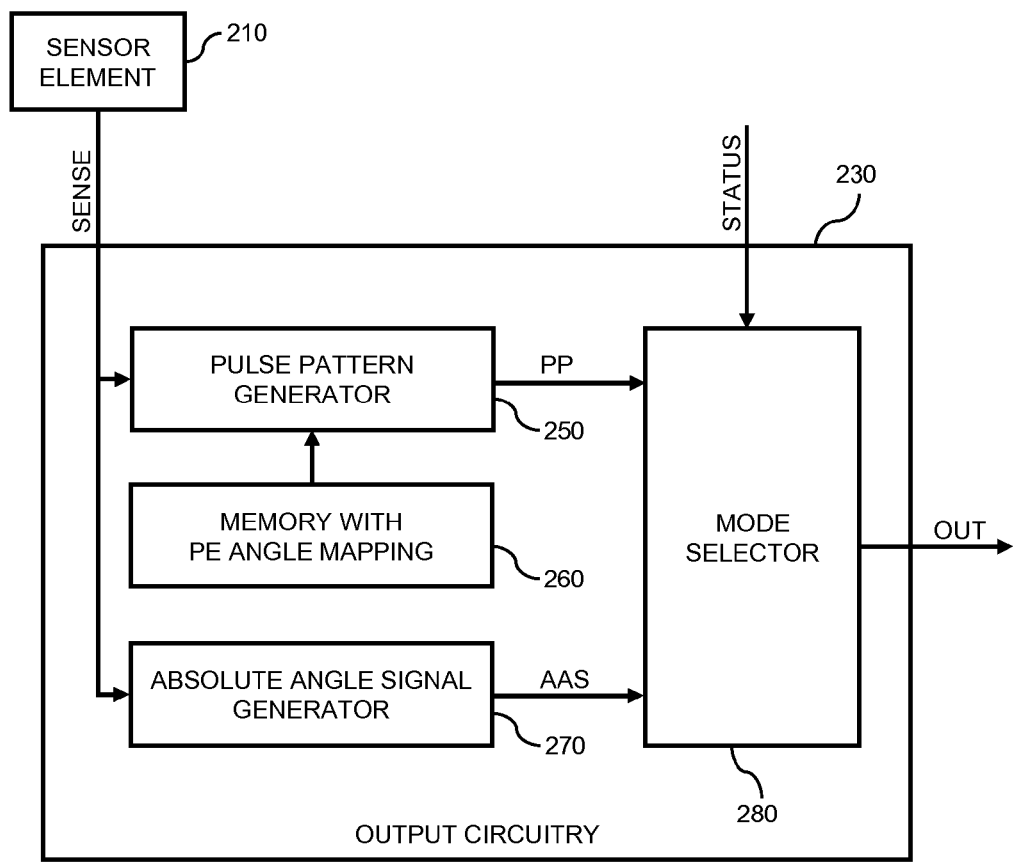
FIG. 2 shows a block diagram for schematically illustrating functionalities of the sensor device.

As illustrated in FIG. 2, the output circuitry 230 includes a pulse pattern generator 250 and a memory 260. The pulse pattern generator 250 is configured to generate a signal PP which includes a pattern of pulses. This is accomplished depending on the sensed orientation angle of the magnetic field, in FIG. 2 represented by signal SENSE, and a pulse edge (PE) angle mapping as stored in the memory. The memory 260 may for example be implemented by a suitable type of semiconductor memory, such as a Read Only Memory (ROM), a Programmable ROM (PROM), an Erasable PROM (EPROM), or a flash memory. An implementation of the memory using PROM, EPROM or flash memory may be used to allow configuration or even reconfiguration of the PE angle mapping stored in the memory 260.

In the illustrated implementation, the PE angle mapping stored in the memory defines, for each pulse of the pulse pattern, an orientation angle associated with a rising edge of the pulse and an orientation angle associated with a falling edge of the pulse. Accordingly, in the pulse pattern generator 250 may operate by comparing the currently sensed orientation to the orientation angles in the mapping and, if the sensed orientation angle passes an orientation angle corresponding to a rising edge, switching the value of the signal PP to a high value or, if the sensed orientation angle passes an orientation angle corresponding to a falling edge, switching the value of the signal PP to a low value. In this way, various kinds of pulse patterns may be generated, including highly asymmetric pulse patterns in which, over the course of a complete rotation of the cam shaft 100, each pulse differs from the other pulses with respect to its pulse-duty ratio.

As further illustrated, the output circuitry 230 may also include an absolute angle signal generator 270 which is configured to generate a signal AAS which represents the absolute orientation angle of the cam shaft 100 in the range from 0° to 360°. The signal AAS may for example represent the absolute orientation angle of the cam shaft 100 as an analog value. Further, the signal AAS may encode the absolute orientation angle of the cam shaft 100 as a digital value or a pulse width modulated value. The absolute angle signal generator 270 may derive the absolute orientation angle of the cam shaft from the orientation angle of the magnetic field as sensed by the sensor element by for example adding an offset which takes into account the mounting orientation of the magnet 220 on the cam shaft 100. The absolute angle signal generator 270 may also perform signal conversion, e.g., from an analog representation of the signal SENSE to a digital or pulse width modulated representation of the signal AAS.

In some implementations, the absolute angle signal generator 270 may also be configured to generate further signals from the orientation angle sensed by the sensor element 210. For example, the absolute angle signal generator 270 may generate a signal representing the angular speed of the cam shaft 100, e.g., by calculating the derivative of the absolute orientation angle of the cam shaft 100.

As further illustrated, the output circuitry 230 may include a mode selector 280. The mode selector 280 may be used for selecting between different operating modes of the output circuitry 230. In particular, the mode selector 280 may be used for selecting between a first operating mode, in which the output circuitry 230 outputs the signal PP as its output signal OUT, and a second operating mode, in which the output circuitry outputs the signal AAS as its output signal OUT. The mode selector 280 nay operate depending on an operation status of the engine, as for example indicated by input signal STATUS of the output circuitry 230. For example, in a startup phase of the engine the mode selector 280 may select the second operating mode, thereby providing useful information on the current rotation angle of the cam shaft 100 even when the cam shaft is substantially static, which means that the signal PP may not yet have a sufficient number of pulses for evaluation of the current rotation angle. After a certain number of rotations of the cam shaft 100, e.g., after one complete rotation, or if the angular speed of the cam shaft 100 exceeds a threshold value, the mode selector 280 may select the first operation mode, in which the output signal OUT may be generated to emulate an output signal as typically provided by conventional toothed wheel based rotation sensors.

Figure 3A:
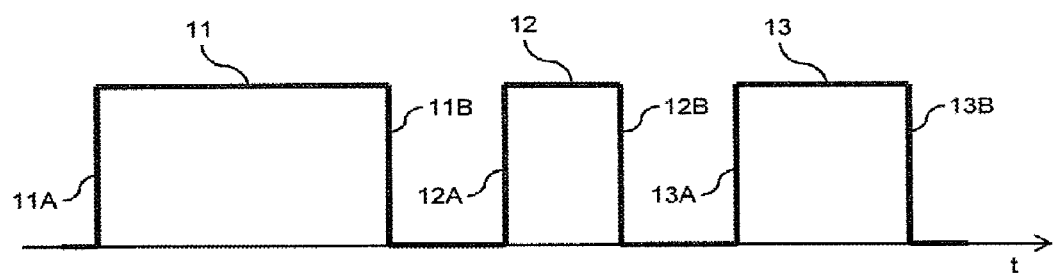
FIG. 3A shows an exemplary pulse pattern in a signal generated by the sensor device.
Figure 3B:
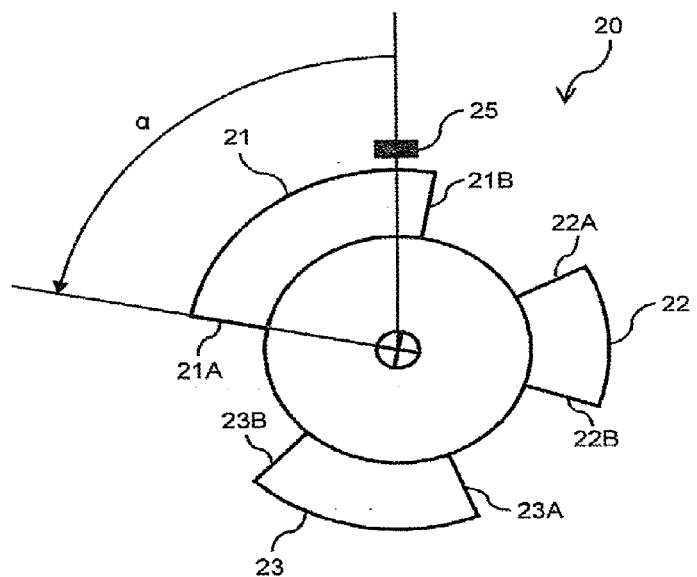
FIG. 3B schematically illustrates a toothed wheel based rotation sensor having a toothed wheel with a profile which corresponds the pulse pattern of FIG. 3A.

An exemplary pulse pattern as included in the signal PP is illustrated in FIG. 3A. The pulse pattern is assumed to emulate an output signal of a toothed wheel based rotation sensor 20 as schematically illustrated in FIG. 3B. In the illustrated example, the pulse pattern consists of three pulses 11, 12, 13, each having a different pulse duty ratio. Each pulse 11, 12, 13 corresponds to a tooth 21, 22, 23 of a toothed wheel of the toothed wheel based rotation sensor 20. In particular, the pulse 11 corresponds to tooth 21 of the toothed wheel, the pulse 12 corresponds to tooth 22 of the toothed wheel, and the pulse 13 corresponds to tooth 21 of the toothed wheel.

In the rotation sensor 20, the teeth 21, 22, 23 each have two edges 21A, 21B, 22A, 22B, 23A, 23B extending in a substantially radial direction and defining an angular position and extension of the tooth 21, 22, 23. If during rotation of the toothed wheel the rotation angle α increases, the teeth 21, 22, 23 subsequently pass a sensor 25. For example, the sensor 25 can be a Hall sensor, and at least the teeth 21, 22, 23 of the toothed wheel may be formed of a ferromagnetic material. A bias magnet located adjacent to the sensor 25 may magnetize the teeth 21, 22, 23 as they pass the sensor 25, which results in a pulse like variation of the output signal of the sensor 25. The pulse pattern of such output signal is emulated by the signal PP, as illustrated in FIG. 3A. In the illustrated example, the pulse pattern of FIG. 3A has a rising pulse edge 11A of the pulse 11 at a time when the edge 21A of the tooth 21 would pass the sensor 25, and has a falling pulse edge 11B at a time when the edge 21B of the pulse 21 would pass the sensor 25. Similarly, the pulse pattern of FIG. 3A has a rising pulse edge 12A of the pulse 12 at a time when the edge 22A of the tooth 22 would pass the sensor 25, and has a falling pulse edge 12B at a time when the edge 22B of the pulse 22 would pass the sensor 25. Similarly, the pulse pattern of FIG. 3A has a rising pulse edge 13A of the pulse 13 at a time when the edge 23A of the tooth 23 would pass the sensor 25, and has a falling pulse edge 13B at a time when the edge 23B of the pulse 23 would pass the sensor 25.

The output circuitry 230 of the illustrated implementation achieves this emulation by suitably configuring the PE angle mapping stored in the memory 260. For example, when assuming that the edge 21A of the tooth 21 is located at an angular position of 0°, the PE angle mapping may assign a rising pulse edge to the orientation angle of 0°. Similarly, if the edge 21B of the tooth 21 is located at an angular position of 90°, the PE angle mapping may assign falling pulse edge to the orientation angle of 90°. For the other teeth 22, 23 corresponding assignments may be done depending on the angular position and extension of the teeth 22, 23. In the assignment of rising and falling pulse edges, also an offset between the orientation angle of the magnetic field and the rotation angle of the cam shaft 100 may be taken into account.

It is to be understood that the pulse pattern of FIG. 3A would be repeated with each rotation of the cam shaft 100. Further, the pulse widths and pauses in the pulse pattern would vary according to the rotation speed of the cam shaft 100.

Figure 4:
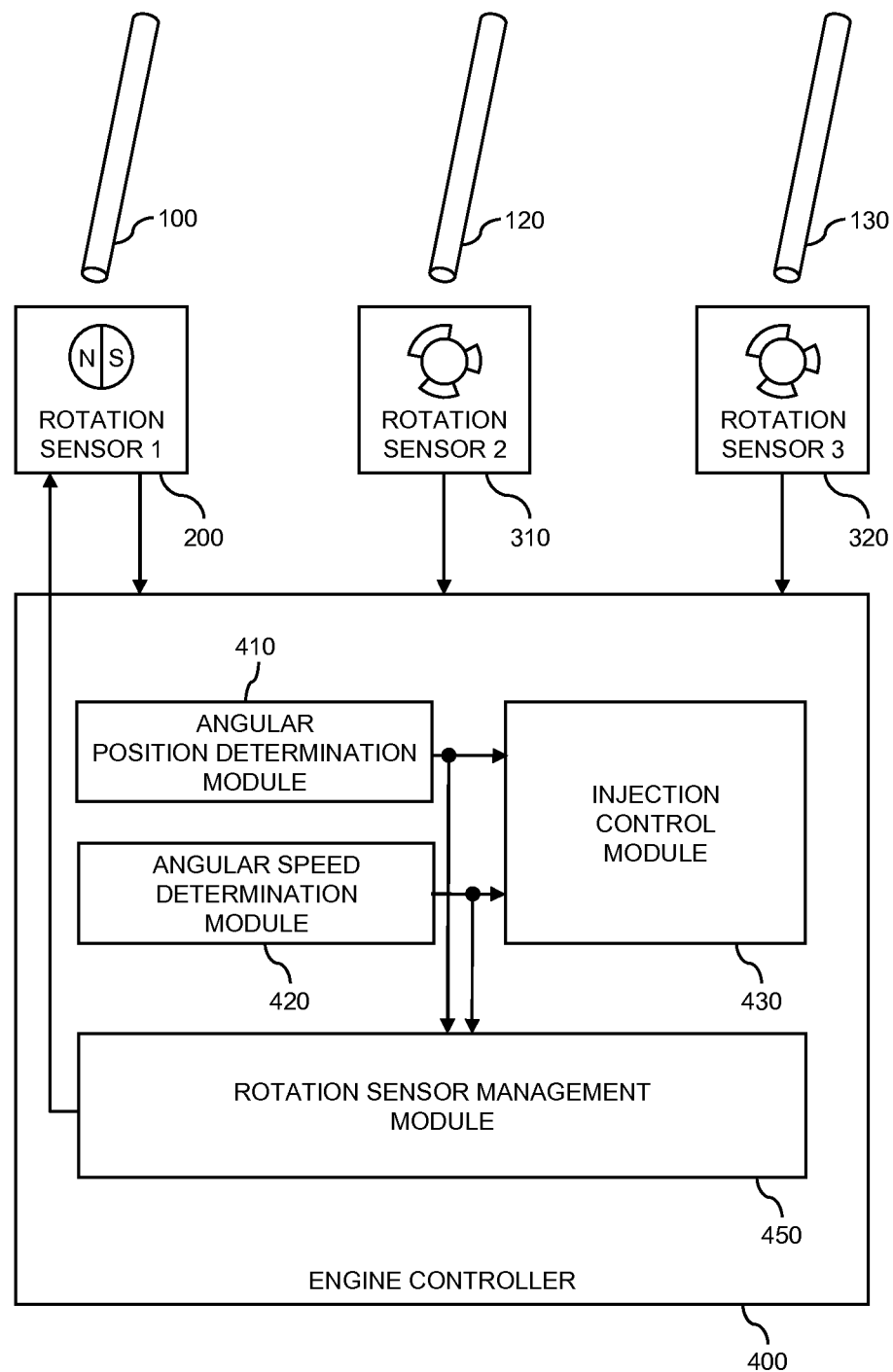
FIG. 4 schematically illustrates an engine control system according to an embodiment of the invention.

As mentioned above, the rotation sensor 200 may be utilized for providing an engine controller with information on the current rotation angle of the cam shaft 100. A corresponding system with the rotation sensor 200 and an engine controller 400 is illustrated in FIG. 4.

As illustrated, the engine controller 400 includes an angular position determination module 410. Further, the engine controller 400 may include an angular speed determination module 420. The angular position determination module 410 and the angular speed determination module 420 receive the output signal of the rotation sensor 200. As mentioned above, this output signal may be generated according to the first mode of operation to include a pulse pattern which emulates the output signal of a conventional toothed wheel based rotation sensor, or may be generated according to the second mode of operation to represent the current rotation angle as an absolute value, e.g., an analog value, a digital value, or a pulse width modulated value. From the received output signal of the rotation sensor 200, the angular position determination module 410 determines the current angular position of the cam shaft 100. In the case of the first operation mode, this may involve counting pulses, distinguishing between wider and narrower pulses, and also consideration of the current angular speed. In the second mode of operation, the current angular position of the cam shaft 100 may be derived more or less directly from the output signal of the rotation sensor 100, possibly with additional application of smoothing, interpolation, and/or extrapolation techniques. Similarly, the angular speed determination module 420 may determines the current angular speed of the cam shaft 100 from the received output signal of the rotation sensor 200. In the case of the first operation mode, this may again involve counting pulses. In the second mode of operation, the current angular speed of the cam shaft 100 may be calculated as the derivative of the rotation angle indicated by the output signal of the rotation sensor 100, possibly with additional application of smoothing, interpolation, and/or extrapolation techniques.

The engine controller 400 further includes an injection control module 430. The injection control module 430 receives the current angular position as determined by the angular position determination module 410 and typically also the current angular speed as determined by the angular speed determination module 420. Depending on this input information, the injection control module 430 controls operation of the engine with respect to injection of fuel into one or more combustion chambers of the engine. For example, the injection control module 430 may control a timing of injection of fuel or air-fuel mixture, a duration of the injection, or opening and/or dwell angles of valves used for the injection.

As further illustrated, the engine controller 400 may also be provided with a rotation sensor management module 450. The rotation sensor management module may for example be responsible for controlling switching of the rotation sensor 200 between the first operating mode and the second operating mode, e.g., by providing the input signal STATUS shown in FIG. 2. Further, the rotation sensor management module 450 may be responsible for performing calibration of the rotation sensor 200. For example, the rotation sensor management module 450 may use the output signal of the rotation sensor 200 as provided in the second mode of operation to calibrate the evaluation of the current angular position from the pulse pattern of the output signal of the second mode of operation. For this purpose, the rotation sensor management module 450 may switch the rotation sensor 200 between the first operating mode and the second operating mode, compare the results of evaluation by the angular position evaluation module 410, and adapt the configuration of the angular position evaluation module 410 with respect to the first operating mode with the aim of minimizing the deviation from the results when using the output signal of the second operating mode.

As further illustrated, the engine may also be provided with one or more additional cam shafts 120, 130. In such implementations, further rotation sensors 310, 320 associated with the additional cam shafts 120, 130 could have similar structures and functionalities as the rotation sensor 200. However, as illustrated in FIG. 4, such further rotation sensors could also be toothed wheel based sensors. In the latter case, the output signal of the rotation sensor 200 in the second mode of operation may also be utilized for calibration of the evaluation of a current angular position of the additional cam shafts 120, 130 by the angular position determination module 410.

Figure 5:
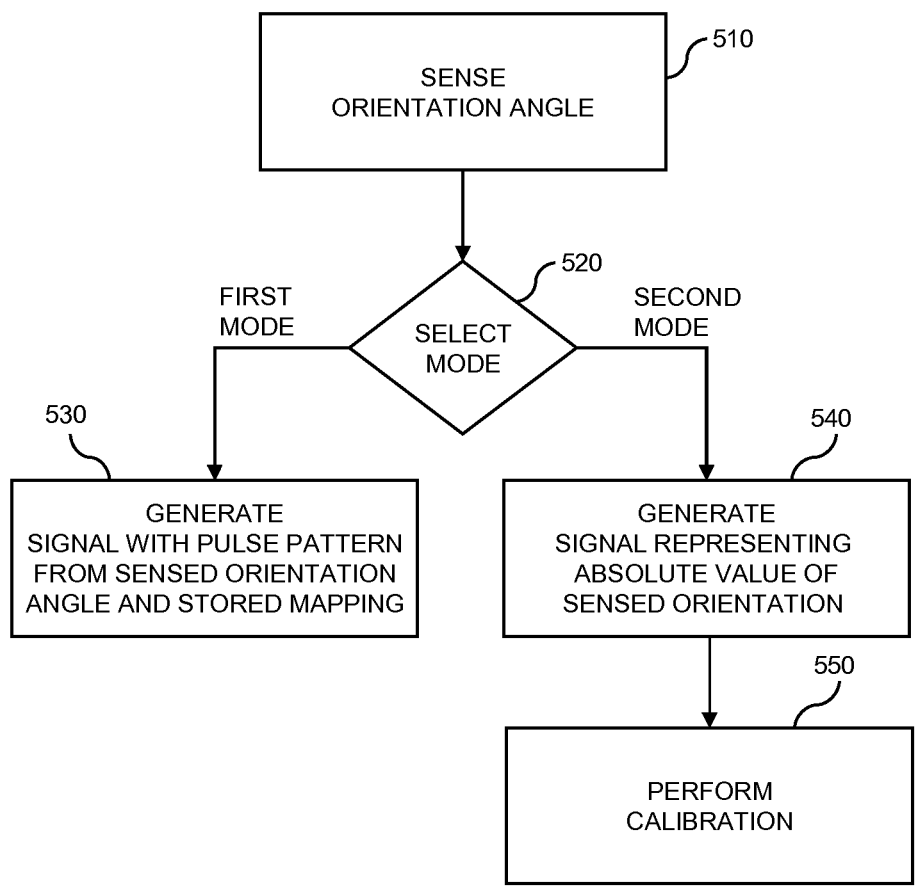
FIG. 5 shows a flowchart for schematically illustrating a method according to an embodiment of the invention.

FIG. 5 shows a flowchart which may be used for implementing the above-described concepts, e.g., by using a sensor device as illustrated in FIGS. 1 and 2 or a system as illustrated in FIG. 4.

At step 510, an orientation angle of a magnetic field of a magnet is sensed. The magnet is arranged on an end face of a cam shaft of an engine. The sensing of the orientation angle is accomplished by a magnetic field sensitive element, such as the sensor element 210 of FIGS. 1 and 2. The magnetic field sensitive element may for example be based on one or more magnetoresistive devices, such as GMR devices, AMR devices, Hall effect devices, or the like. The orientation angle is sensed is sensed in the range of 0° to 360°. This may involve that the magnetic field sensitive element generates one or more signals which represent an absolute value of the orientation angle.

At step 520, an operating mode may be selected. This may for example be accomplished by a mode selection functionality of the sensor device, such as the mode selector 280 of FIG. 2. In particular, an operating mode of electronic circuitry may be selected to provide a corresponding output signal of the sensor device. This may be accomplished according to an operational status of the engine. For example, a first operating mode may be selected during normal operation of the engine, and a second operating mode may be selected at startup of the engine, when the cam shaft is substantially static. As illustrated, when selecting the first mode of operation the method may continue with step 530, and when selecting the second mode of operation the method may continue with step 540.

At step 530, a signal is generated which includes a pattern of pulses with rising and falling pulse edges which are mapped to predefined orientation angles as sensed by the magnetic field sensitive element. This is accomplished depending on the orientation angle sensed at step 510 and a stored mapping of pulse edges to orientation angles. For generating the signal at step 530, the sensor device may be equipped with corresponding electronic circuitry, such as the output circuitry 230 of FIG. 2, which includes the pulse pattern generator 250. The mapping may for example be stored in a memory of the sensor device, such as in the memory 260 of FIG. 2. In some implementations, the mapping may be configurable or even reconfigurable, e.g., by programming the memory.

At step 540, a further signal is generated which represents a current rotation angle of the cam shaft in the range between 0° and 360°. This is accomplished depending on the orientation angle sensed at step 510. For example, this may involve translating the orientation angle of the magnetic field into the orientation angle of the cam shaft by performing an offset correction. Further, this may involve a signal conversion, e.g., from an analog representation to a digital representation or a pulse width modulated representation or vice versa. For generating the further signal at step 540, the sensor device may be equipped with corresponding electronic circuitry, such as the output circuitry 230 of FIG. 2, which includes the pulse absolute angle signal generator 270.

The signal of step 530 or the further signal of step 540 may be utilized as a basis for performing control of the engine. An example of such control is a injection control functionality as for example implemented by the injection control module 430 in the engine controller 400 of FIG. 4. The selection between the operating modes at step 520 may be used for selecting between performing such control of the engine on the basis of the signal of step 530 and performing such control of the engine on the basis of the further signal of step 540. For example, at startup of the engine control of the engine may be performed on the basis of the further signal of step 540, and after a given number of rotations of the cam shaft or if the rotation speed of the cam shaft exceeds a threshold value, control of the engine may be performed on the basis of the signal of step 530.

Both the signal of step 530 and the further signal of step 540 may be used for evaluation of the current rotation angle of the cam shaft. While in the case of the further signal of step 540 this evaluation can be accomplished more or less directly and with high inherent accuracy, the evaluation of the current rotation angle from the pulse pattern in the signal of step 530 may require evaluations of higher complexity with less inherent accuracy. Accordingly, in some implementations, the current rotation angle of the cam shaft is evaluated from the pattern of pulses of the signal of step 530, such as by the absolute angle determination module 410 in the engine controller 400 of FIG. 4, and this evaluation may be calibrated on the basis of the further signal of step 540, as indicated by step 550. Such calibration may for example be accomplished by a calibration functionality of a controller, such as described for the rotation sensor management module 450 in the engine controller 400 of FIG. 4.

In some implementations the calibration of step 550 may also involve calibration of one or more further rotation sensors on the basis of the further signal of step 540. For example, conventional toothed wheel based sensors, such as the additional rotation sensors 310, 320, could be calibrated using the further signal of step 540.

It should be noted that the steps of the method of FIG. 5 do not need to be performed in the illustrated order. For example, the signal of step 530 and the further signal of step 540 could also be generated in parallel, and the selection of step 520 could merely effect which one of these signals is output for further evaluation.

It is to be understood that the above-described concepts and embodiments are susceptible to various modifications. For example, various pulse patterns corresponding to various kinds of toothed wheel profiles could be emulated. Such emulation may also be extended to not only emulate the angular position and extension of teeth, but could also emulate further characteristics of the tooth profile, such as a radial dimension of the tooth or slope of the tooth edges. Further, the rotation sensor could use other kinds of sensing devices or other types of magnets, such as more complex multipole magnets. Further, the concepts may also be applied in a corresponding manner to other types of shafts. For example, in some implementations the cam shaft 100 of the above embodiments could be replaced by a crank shaft of the engine.

What is claimed is:

1. A sensor device, comprising:
   a magnetic field sensitive element to be positioned in a magnetic field of a magnet positioned on an end face of a cam shaft of an engine, the magnetic field sensitive element being configured to sense an orientation angle of the magnetic field in the range between 0° and 360°;
a memory storing a mapping of pulse edges to orientation angles; and
electronic circuitry configured to generate, depending on the sensed orientation angle and said stored mapping of pulse edges to orientation angles, a signal comprising a pattern of pulses with rising and falling pulse edges which are mapped to predefined orientation angles as sensed by the magnetic field sensitive element.

2. The sensor device according to claim 1,
wherein the electronic circuitry is further configured to generate, depending on the sensed orientation angle, a further signal which represents a current rotation angle of the cam shaft in the range between 0° and 360°.

3. The sensor device according to claim 2,
wherein the current rotation angle is represented by a value selected from the group consisting of a digital value, an analog value, and a pulse width modulated value.

4. The sensor device according to claim 2,
wherein the electronic circuitry is provided with a first mode of operation in which the electronic circuitry is configured to output the signal and a second mode of operation in which the electronic circuitry is configured to output the further signal instead of the signal.

5. The sensor device according to claim 4,
wherein the electronic circuitry is configured to switch between the first mode of operation and the second mode of operation according to an operational status of the engine.

6. The sensor device according to claim 5,
wherein the electronic circuitry is configured to use the second mode of operation at startup of the engine.

7. The sensor device according to claim 6,
wherein the electronic circuitry is configured to switch to the first mode of operation after a given number of rotations of the cam shaft.

8. The sensor device according to claim 1,
wherein the electronic circuitry is further configured to generate, depending on the sensed orientation angle, a further signal which represents an angular speed of the cam shaft.

9. The sensor device according to claim 8,
wherein the angular speed is represented by a value selected from the group consisting of a digital value, an analog value, and a pulse width modulated value.

10. The sensor device according to claim 1,
wherein in the stored mapping is configurable.

11. The sensor device according to claim 1, wherein the magnet is positioned on the end face of the shaft.

12. A system, comprising:
a controller; and
at least one sensor device comprising a magnetic field sensitive element configured to sense an orientation angle of a magnetic field associated with a cam shaft of an engine,
the at least one sensor device being configured to output a first signal and a second signal,
the first signal being generated depending on the sensed orientation angle and a stored mapping of pulse edges to orientation angles and comprising a pattern of pulses with rising and falling pulse edges which are mapped to predefined orientation angles as sensed by the magnetic field sensitive element,
the second signal representing the current rotation angle of the shaft in the range between 0° and 360°,
the controller being configured to receive the first signal and the second signal and to control the engine depending on the first signal and the second signal.

13. The system according to claim 12,
wherein the at least one sensor device is provided with a first mode of operation in which the electronic circuitry is configured to output the first signal and a second mode of operation in which the at least one sensor device is configured to output the second signal instead of the first signal.

14. The system according to claim 13,
wherein the controller is configured to control switching of the at least one sensor device between the first mode of operation and the second mode of operation according to an operational status of the engine.

15. The system according to claim 14,
wherein the controller is configured to switch the at least one sensor device to the second mode of operation at startup of the engine and to switch the at least one sensor device to the first mode of operation after a given number of rotations of the cam shaft.

16. The system according to claim 12,
wherein the at least one sensor device is further configured to generate a further signal which represents an angular speed of the cam shaft.

17. The system according to claim 12,
wherein the controller is configured to evaluate the rotation angle of the cam shaft from the pattern of pulses of the first signal.

18. The system according to claim 17,
wherein the controller is configured to calibrate said evaluation of the rotation angle of the cam shaft using the second signal.

19. The system according to claim 12, comprising:
at least one further sensor device associated with a further cam shaft of the engine,
the at least one further sensor device being configured to output a third signal,
the further signal comprising a further pattern of pulses with rising and falling edges of the pulses being mapped to predefined rotation angles of the further cam shaft,
wherein the controller configured to evaluate the rotation angle of the further cam shaft from the pattern of pulses of the third signal and to calibrate said evaluation of the rotation angle of the further cam shaft using the second signal.

20. A method, comprising:
a magnetic field sensitive element, positioned in a magnetic field of a magnet arranged on an end face of a cam shaft of an engine, sensing an orientation angle of the magnetic field in the range between 0° and 360°;
generating, depending on the sensed orientation angle and a stored mapping of pulse edges to orientation angles, a signal comprising a pattern of pulses with rising and falling pulse edges which are mapped to predefined orientation angles as sensed by the magnetic field sensitive element;
generating, depending on the sensed orientation angle, a further signal which represents a current rotation angle of the cam shaft in the range between 0° and 360°; and
selecting, according to an operational status of the engine, between performing control of the engine on the basis of the signal and performing control of the engine on the basis of the further signal.

21. The method according to claim 20,
at startup of the engine, performing control of the engine on the basis of the further signal.

22. The method according to claim 21, comprising:
after a given number of rotations of the cam shaft, performing control of the engine on the basis of the signal.

23. A method, comprising:
a magnetic field sensitive element, positioned in a magnetic field of a magnet arranged on an end face of a cam shaft of an engine, sensing an orientation angle of the magnetic field in the range between 0° and 360°;
generating, depending on the sensed orientation angle and a stored mapping of pulse edges to orientation angles, a signal comprising a pattern of pulses with rising and falling pulse edges which are mapped to predefined orientation angles as sensed by the magnetic field sensitive element;
generating, depending on the sensed orientation angle, a further signal which represents a current rotation angle of the cam shaft in the range between 0° and 360°;
evaluating the rotation angle of the cam shaft from the pattern of pulses of the signal; and
calibrating said evaluation of the rotation angle of the cam shaft using the further signal.

* * * * *